Nov. 18, 1969
K. N. MATHES
3,479,218
METHOD OF TREATING INSULATED WIRE
Filed Aug. 24, 1966
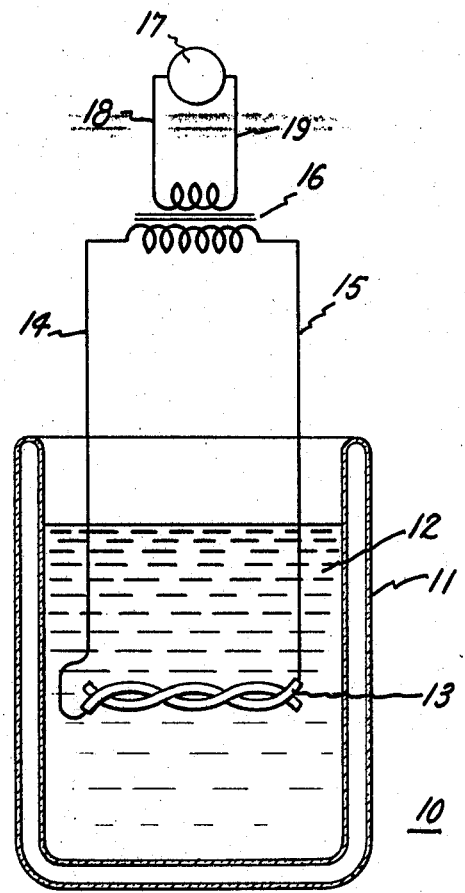
Inventor:
Kenneth N. Mathes,
by Paul R. Webb, II
His Attorney.

3,479,218
METHOD OF TREATING INSULATED WIRE
Kenneth N. Mathes, Schenectady, N.Y., assignor to General Electric Company, a corporation of New York
Filed Aug. 24, 1966, Ser. No. 574,746
Int. Cl. B44d 1/42, 1/44; C08k 1/82
U.S. Cl. 117—231             3 Claims The invention described herein was made in the performance of work under a NASA contract and is subject to the provisions of Section 305 of the National Aeronautics and Space Act of 1958, Public Law 85-568 (72 Stat. 435; 42 U.S.C. 2457).

This application relates to methods of treating glass fiber insulated wire and, more particularly, to such methods whereby a substantial improvement is made in the electrical breakdown voltage of the glass fiber insulated wire when subjected to a liquid nitrogen environment.

Glass fiber insulated wire is useful for a wide variety of cryogenic applications, including superconducting magnets, switching elements, generators, motors, capacitors, cables and transformers. In such applications, it is necessary to provide insulated wires with good electrical breakdown voltage at cryogenic operating temperature. Thus, it would be desirable to improve the electrical breakdown voltage of such insulated wires thereby improving the electircal strength of the conductor wire.

It is an object of my invention to provide a method of treating a wire insulated with glass fiber whereby such wire will have increased electrical breakdown voltage in a liquid nitrogen environment.

It is another object of my invention to provide a method of treating a plurality of wires, each of which is insulated with glass fiber, whereby each wire will have increased electrical breakdown voltage when subjected to a liquid nitrogen environment.

It is a further object of my invention to provide a method of treating a winding of wire insulated with glass fiber whereby the winding will have increased electrical breakdown voltage when subjected to a liquid nitrogen environment.

In accordance with my invention, wire insulated with glass fiber can be treated to improve its electrical breakdown voltage when subsequently employed in a liquid nitrogen environment by immersing the insulated wire in water prior to subjecting the wire to the liquid nitrogen environment.

These and various other objects, features and advantages of the invention will be better understood from the following description taken in connection with the accompanying drawing.

In "Electrical Insulation at Cryogenic Temperatures" by K. N. Mathes, in the September 1963 issue of "Electro-Technology," on pages 72–77, there is described certain effects upon electrical insulation at cryogenic temperatures. On page 76 of the subject article, Table 3 sets forth the average electrical breakdown voltage for various types of insulated wire which was conducted on standard twisted-pair wire samples. It is pointed out in this table that wire insulated with glass fiber with a ML coating had an average electrical breakdown voltage in air at 23° C. of 2,100 volts. This particular insulation is glass fiber which is impregnated with an aromatic polyimide. When this wire sample was subjected to a liquid nitrogen environment the average electrical breakdown voltage increased to 11,250 volts. Thus, subjecting this insulated wire to a nitrogen environment, which is a good dielectric, increased the electrical strength of the material.

I discovered unexpectedly that wire insulated with glass fiber exhibited a substantial improvement in electrical breakdown voltage by immersing the insulated wire in water prior to subjecting the wire to a liquid nitrogen environment. Such wire can be employed in a single strand, in a plurality of strands, or in a winding. Either distilled water or tap water is effective for immersing the insulated wire.

A wire insulated with glass fiber had an average electrical breakdown voltage in air at 23° C. of 1,200 volts. When this same type of insulated wire was subjected to a liquid nitrogen environment, such breakdown voltage was increased to about 10,000 volts. I found unexpectedly that the same type of insulated wire, which was treated in accordance with the method of my invention, had an electrical breakdown voltage of 18,000 volts when subjected to a liquid nitrogen environment.

In carrying out the method of my invention, a pair of twisted wires insulated with glass fiber was employed. This pair of wires was immersed in a bath of distilled water for several minutes, after which it was removed and was then shaken gently to remove excess water. The wire pair was then placed in an insulated container filled with liquid nitrogen. The average electrical breakdown voltage was then measured.

In the single figure of the drawing, an apparatus is shown generally at 10 for determining the average electrical voltage breakdown of an insulated conductor in a liquid nitrogen environment. Apparatus 10 comprises an insulated container 11 filled with liquid nitrogen 12 in which the above-described pair of twisted insulated wires shown at 13 are positioned. The opposite ends of different wires in the pair of wires 13 are connected by leads 14 and 15 to the terminals of a transformer 16. A variac 17 is connected by a pair of leads 18 and 19 to the other terminals of transformer 16. A power source (not shown) is provided for variac 17 whereby the voltage is varied across the pair of wires 13.

In determining the average electrical breakdown voltage of the pair of wires 13, variac 17 is used to increase the voltage until breakdown occurs. With the above-described treated pair of wires, such breakdown occurred at 18,000 volts, a substantial increase over the above untreated pair of wires with a breakdown of about 10,000 volts. If it is desired, a single insulated wire of the above type, which has been treated in accordance with my method, can be tested in apparatus 10 in substantially the same manner.

What I claim as new and desire to secure by Letters Patent of the United States is:

1. A method for improving the breakdown voltage of glass fiber insulated wire at cryogenic operating temperatures comprising providing a wire insulated with glass fiber, immersing said insulated wire in water, and subjecting said wire to a liquid nitrogen environment.

2. A method as in claim 1, wherein a plurality of said conductor wires are used.

3. A method as in claim 1, wherein a winding of said conductor wire is used.

References Cited

UNITED STATES PATENTS 3,336,549    8/1967    Kazka et al. _____ 335—216

WILLIAM L. JARVIS, Primary Examiner

U.S. Cl. X.R.
117—62, 119.4